United States Patent [19]

Shiozaki et al.

[11] Patent Number: 4,743,827
[45] Date of Patent: May 10, 1988

[54] VARIABLE SPEED PUMPING-UP ELECTRICAL POWER SYSTEM

[75] Inventors: Junichi Shiozaki; Takao Kuwabara; Akira Bando, all of Hitachi; Kenichi Ono, Kodaira; Akihiro Sakayori, Hitachi; Ichiro Hitomi, Katsuta; Masahiro Minato, Takamatsu; Shigeaki Hayashi, Suita, all of Japan

[73] Assignee: Hitachi, Ltd., Tokyo, Japan

[21] Appl. No.: 44,789

[22] Filed: Apr. 29, 1987

[30] Foreign Application Priority Data

Apr. 30, 1986 [JP] Japan .................................. 61-99844

[51] Int. Cl.⁴ .............................................. H02P 5/40
[52] U.S. Cl. ..................... 318/798; 318/806
[58] Field of Search ................. 318/807–811, 318/798, 806

[56] References Cited

U.S. PATENT DOCUMENTS 4,158,163 6/1979 Eriksen et al. .................. 318/798
4,200,833 4/1980 Wilkerson .......................... 323/20
4,276,505 6/1981 Bose .................................... 318/809

OTHER PUBLICATIONS

"Recent Control System for Hydro-Power Plant", Hitachi Review, vol. 28 (1979), No. 4, pp. 193-198.

Primary Examiner—David Smith, Jr.
Attorney, Agent, or Firm—Fay, Sharpe, Beall, Fagan, Minnich & McKee

[57] ABSTRACT

Disclosed in a variable speed pumping-up electrical power system comprising a variable speed generator/motor, a frequency converter connected between the generator/motor and an a.c. power system, a controller controlling an effective power input to the generator/motor by controlling the frequency converter on the basis of the difference between an actual effective power input from the a.c. power system and an externally-applied effective power command, and a correction circuit correcting the effective power command on the basis of the difference between the frequency of the a.c. power system and a frequency setting.

4 Claims, 8 Drawing Sheets

F I G. I

VARIABLE SPEED PUMPING-UP ELECTRICAL POWER SYSTEM

BACKGROUND OF THE INVENTION

This invention relates to a variable speed pumping-up electrical power system including a rotary electrical machine and a frequency converter connected to an a.c. power system, and more particularly to an electrical power system of the type described above in which the electrical machine can be operated at a rotation speed independent of the frequency of the a.c. power system.

A prior art, fixed speed pumping-up electrical power system has a problem in that its load cannot be regulated when its pump/turbine is placed in a pumping operation mode. In a pumping-up electrical power system using, for example, a synchronous machine, an input determined by the rotation speed of the synchronous machine is applied to the pump/turbine when the pump/turbine is placed in its pumping operation mode, and no function for regulating the input power from the a.c. power system is provided. Therefore, researches and studies have been made in which an induction machine provided with a secondary exciter is used in place of the synchronous machine to permit load regulation. For example, the principle of load regulation was stated in a paper entitled "Researches and Developments of Variable Speed Pumping-up Electrical Power System" reported in Joint Convention of Kansai Branch of the Institute of Electrical Related Engineers of Japan in 1985. However, no practical method for load regulation was reported in the convention.

SUMMARY OF THE INVENTION

It is an object of the present invention to provide a variable speed pumping-up electrical power system which includes a variable speed generator/motor and a frequency converter, in which a load of the generator/motor operating as the motor driving a pump/turbine as a pump in a pumping operation mode can be easily regulated, and which can cooperate with a.c. power-system control means to carry out control such as automatic frequency control (AFC).

The above object of the present invention is attained by the following means: (1) The variable speed pumping-up electrical power system includes a power controller which compares an actual effective power detection signal with an effective power command input signal externally applied from, for example, a central load-dispatching office, to find the difference therebetween and controls the motor so as to decrease the difference to null. The variable speed pumping-up electrical power system also includes a frequency controller which compares a setting of an a.c. power system frequency with a command value to find the difference therebetween and corrects the effective power command signal depending on the difference. (2) The pumping-up electrical power system includes a pump characteristic function generator which produces an optimum guide-vane opening command signal on the basis of a pump head signal and an actual pump/turbine rotation speed detection signal and applies the optimum guide-vane opening command signal to a guide vane regulator to control the opening of guide vanes so that the pump can operate with its highest efficiency. (3) When the rotation speed of the pump/turbine deviates from a pre-set speed range, the effective power command signal is adjusted to decrease the deviation to null.

The present invention utilizes the fact that, when a variable speed pumping-up electrical power system is operating in its steady state, a load of its variable speed electrical machine connected to an a.c. power system is substantially determined by the rotation speed of a pump/turbine operating as a pump. That is, the operation of the variable speed rotary electrical machine is controlled so as to eliminate any deviation of an actual effective power detection signal from an effective power command input signal. As a result of such control, the pump rotation speed falls within a pump rotation speed range between an upper limit and a lower limit determined by the command input signal, and the pump can thus be stably operated.

Further, the efficiency of the pump/turbine is determined by its rotation speed, the head and the guide vane opening. Therefore, on the basis of the rotation speed and head of the pump/turbine, the guide vane opening can be controlled so that the pump/turbine can operate at its highest efficiency.

Although the rotation speed of the pump/turbine is determined by the torque based on the difference between the motor output and the pump output, the rotation speed of the pump/turbine may transiently deviate from the allowable variable speed range. Thus, only when the rotation speed of the pump/turbine deviates from a pre-set speed range, the motor input is to be regulated to decrease the speed deviation to null, so that the rotation speed of the pump/turbine can be maintained within the allowable variable speed range, and the pump/turbine can be stably operated.

DESCRIPTION OF THE PREFERRED EMBODIMENTS

A prior art, fixed speed pumping-up electrical power system, as disclosed in "Recent Control System for Hydro-Power Plant" Hitachi Review, Vol. 28 (1979), No. 4, pages 193-198, will be briefly described before describing preferred embodiments of the present invention in detail.

Figure 9:
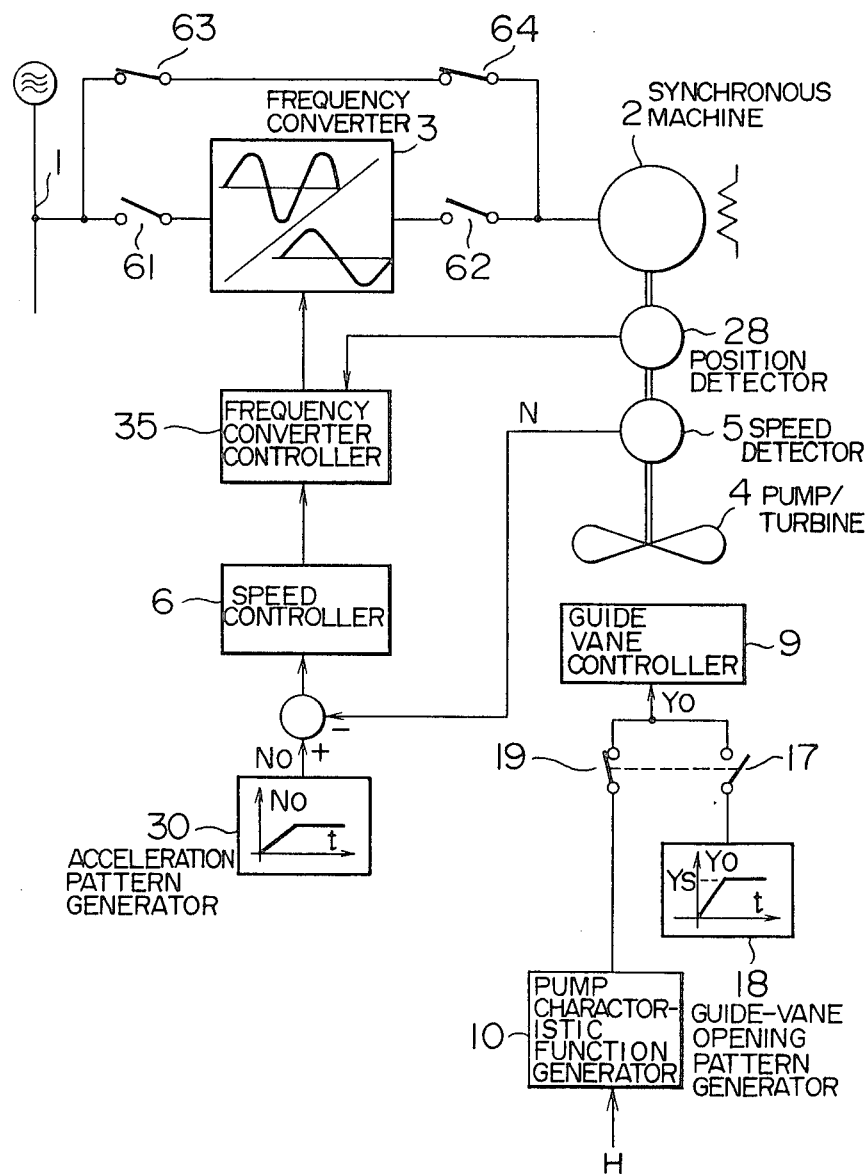
FIG. 9 is a block diagram showing a prior art, fixed speed pumping-up electrical power system.

FIG. 9 is a block diagram showing such a prior art, fixed speed pumping-up electrical power system using a d.c.-excited synchronous machine. Referring to FIG. 9, an a.c. power system 1 is connected through an ac-dc-ac power converter or a frequency converter 3 to a synchronous machine 2 which drives a pump/turbine 4. Connected to the synchronous machine 2 are a position detector 28 for detecting a rotational position of the rotor relative to the stator winding and a rotation speed detector 5 to generate a position signal at a specific angular position of the rotor and a rotation speed signal respectively. A frequency converter controller 35 controls the frequency of the output of the frequency converter 3 according to the output signal of the position detector 28. A speed controller 6 is connected to the frequency converter controller 35 so that the frequency converter controller 35 controls the frequency converter 3 to increase or decrease the output of the synchronous machine 2 according to the output signal of the speed controller 6.

The fixed speed pumping-up electrical power system shown in FIG. 9 starts its pumping operation from its non-operating state until finally it operates in its steady state.

When the pumping-up electrical power system is not in operation, switches 61 and 62 are in their closed position, while switches 63 and 64 are in their open position, so that the circuit is formed to drive the synchronous machine 2 by the frequency converter 3. At this time, the pump/turbine 4 is at a water depressed condition, and switches 19 and 17 are in their open and closed positions, respectively. Because the switch 17 in its off position, no guide-vane opening command signal $Y_0$ is applied from a guide-vane opening command pattern generator 18.

When the pumping-up electrical power system is placed in operation, the rotation speed of the pump/turbine 4 increases progressively according to a predetermined pattern provided by a pump rotation-speed command signal $N_0$ generated from an acceleration pattern generator 30 until the rotation speed is finally maintained constant. Then, the switches 61 and 62 are opened, while the switches 63 and 64 are opened, and the pump/turbine 4 is driven at a synchronous constant speed by the synchronous machine 2. Then, the water level depressing command is cancelled, and, after confirming build-up of hydraulic pressure of priming water supplied for starting pumping operation, the level of the guide-vane opening command signal $Y_0$ is increased from zero to $Y_S$ to start the pumping operation. Then, the switches 19 and 17 are closed and opened respectively, and a pump characteristic function generator 10, to which a head detection signal H is applied, applies a guide-vane opening command signal $Y_0$ ensuring an optimum efficiency relative to the detected head H to a guide vane controller 9 thereby controlling the opening of guide vanes during the pumping operation.

In the prior art system, the pump/turbine input is substantially determined by the rotation speed, and there is no function of regulating input power supplied from the a.c. power system.

Figure 1:
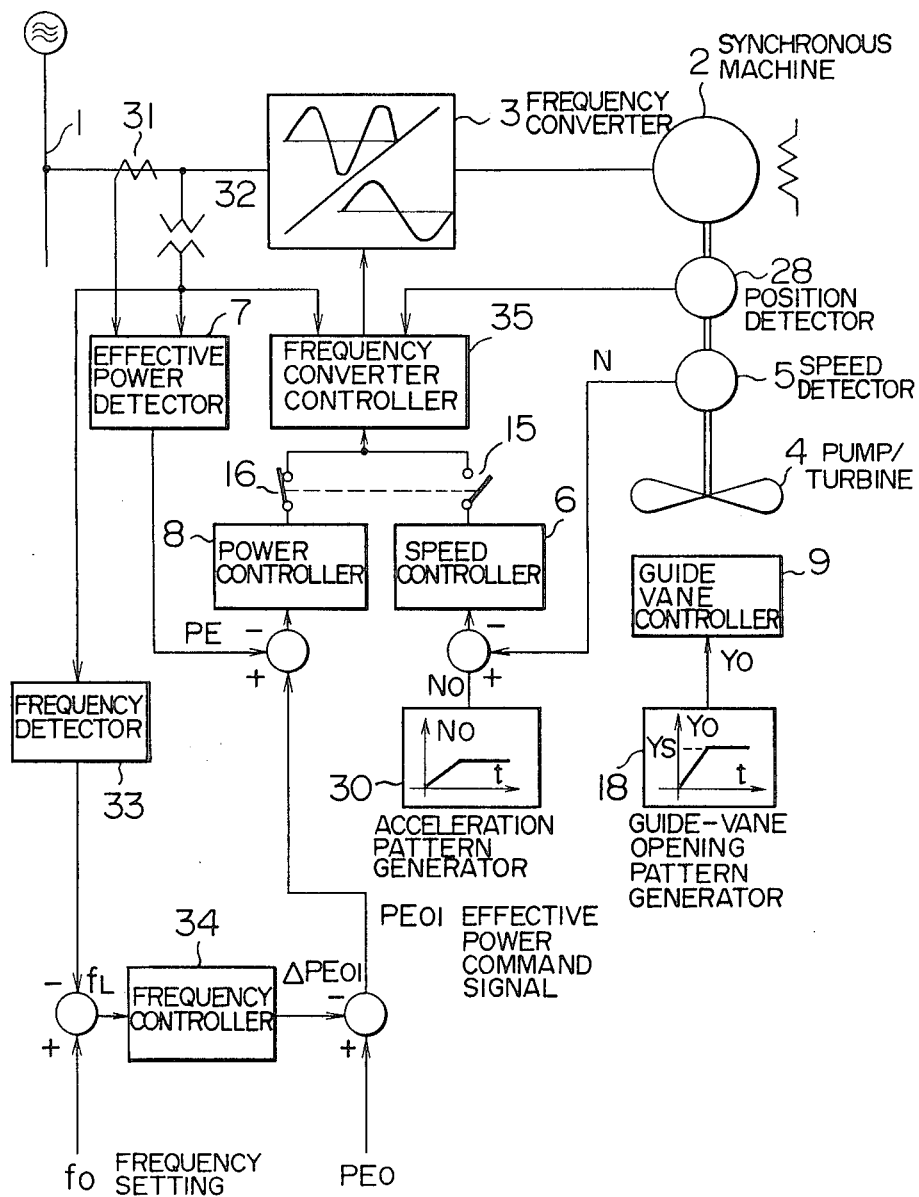
FIG. 1 is a block diagram showing a first embodiment of the variable, speed pumping-up electrical power system according to the present invention.

A first embodiment of the variable speed pumping-up electrical power system according to the present invention will now be described with reference to FIGS. 1 and 2. In FIG. 1, like reference numerals are used to designate like parts appearing in FIG. 9. In the first embodiment of the present invention, a synchronous machine 2 is used as a variable speed generator/motor and a frequency converter 3 is provided between the synchronous machine 2 and an a.c. power system 1. Unlike the prior art system shown in FIG. 9, the frequency converter 3 is kept connected to the synchronous machine 2 irrespective of whether the pumpingup electrical power system is in its starting stage or in any other stage.

A position detector 28 is directly connected to the rotor of the synchronous machine 2 which drives a pump/turbine 4 for detecting a rotational position of the rotor relative to the stator of the synchronous machine thereby generating a position signal. A frequency converter controller 35 controls the frequency of the output of the frequency converter 3 according to the position signal of the position detector 28. A speed controller 6 and a power controller 8 are connected through respective switches 15 and 16 to the frequency converter controller 35 so that the frequency converter controller 35 controls the frequency converter 3 to increase or decrease the output of the synchronous machine 2 according to the output signal of the speed controller 6 or power controller 8. The embodiment shown in FIG. 1 differs from the prior art system shown in FIG. 9 in that the frequency converter controller 35 controls the frequency converter 3 according to the output signal of the power controller 8 too.

A current transformer 31 and a potential transformer 32 associated with the a.c. power system 1 are connected to an effective power detector 7 which generates an effective power detection signal PE which is applied to the power controller 8. A frequency detector 33 generates a system frequency detection signal $f_L$ which is compared with a frequency setting $f_0$, and an error signal indicative of the error therebetween is applied to a frequency controller 34 which generates a frequency correction signal $\Delta PE_{01}$ which is added to an effective power command signal $PE_0$ to provide a corrected effective power command signal $PE_{01}$. The effective power detection signal PE and the corrected effective power command signal $PE_{01}$ are compared with each other, and an error signal indicative of the error therebetween is applied to the power controller 8 which acts to decrease the error to null.

An acceleration pattern generator 30 generates a pump rotation speed command signal $N_0$, and a pump speed detector 5 directly connected to the pump/turbine 4 generates a pump rotation speed detection signal N. The pump rotation speed command signal $N_0$ and the pump rotation speed detection signal N are compared with each other, and an error signal indicative of the error therebetween is applied to the speed controller 6 which acts to decrease the error to null.

The variable speed pumping-up electrical power system shown in FIG. 1 starts its pumping operation from its non-operating state until finally it operates in its steady state.

When the pumping-up electrical power system is not in operation, the switches 15 and 16 are in their closed and open positions respectively, and the rotation speed N of the pump/turbine 4 is controlled to be equal to the speed command value $N_0$. At this time, the draft tube water level of the pump/turbine 4 is kept depressed, and no guide-vane opening command signal $Y_0$ is applied from a guide-vane opening command pattern generator 18.

When the pumping-up electrical power system is placed in operation, the rotation speed N of the pump 4 increases according to a predetermined pattern provided by the pump rotation-speed command signal $N_0$ until finally the rotation speed N is maintained constant. Under the above state, the pressure depressing the water level is released, and, after confirming build-up of hydraulic pressure of priming water supplied for starting pumping operation, the level of the guide-vane opening command signal $Y_0$ is increased from zero to $Y_S$ to start the pumping operation. Then, the switches 15 and 16 are opened and closed respectively to continue the pumping operation under automatic frequency control (AFC).

The first embodiment of the present invention thus comprises means for carrying out pumping operation under AFC and is featured in that the effective power responds to an error of the system frequency, that is, it operates with a so-called governor-free function.

Figure 2:
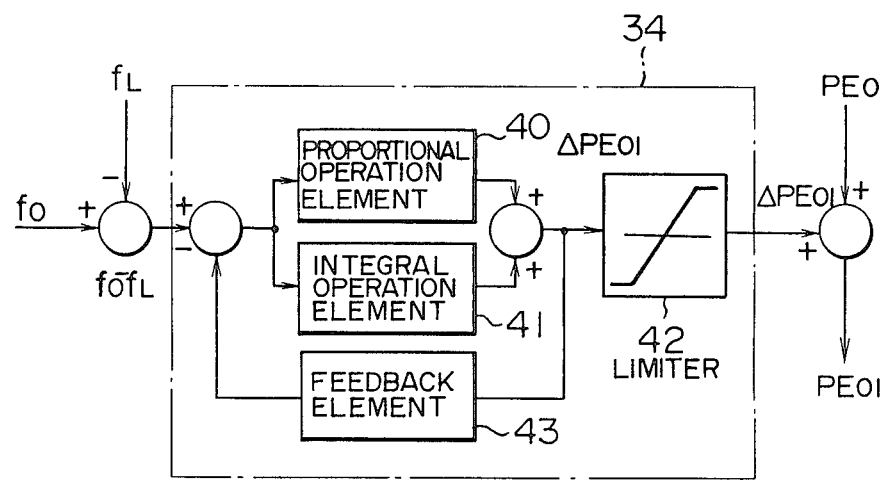
FIG. 2 is a block diagram showing the structure of the frequency/controller shown in FIG. 1.

FIG. 2 shows the structure of one form of the frequency controller 34 shown in FIG. 1. Referring to FIG. 2, the frequency error signal ($f_O$-$f_L$) is subjected to PI (proportional plus integral) control by a proportional operation element 40 and an integral operation element 41. Output signals of these two elements 40 and 41 are added together, and the resultant signal is passed through a feedback element 43 to be subtracted from the error signal ($f_O$-$f_L$). Thus, when the frequency error is null, the output signal $\Delta PE_{01}$ of the frequency controller 34 can be rendered null. The output signal $\Delta PE_{01}$ of the frequency controller 34 is added to the externally applied, effective power command signal $PE_0$ to provide the corrected effective power command signal $PE_{01}$ applied to the power controller 8. A limiter 42 determines an upper limit and a lower limit of the correction signal $\Delta PE_{01}$, so that the value of $\Delta PE_{01}$ may not become larger or smaller than the upper limit or lower limit, and an overcorrection may not result.

Thus, the load variation of the power system associated with the variable speed generator/motor is substantially shared by the generator/motor so as to suppress variation in the rotation speed of other synchronous machines connected to the power system or variation in the frequency of the power system, thereby maintaining the constant system frequency.

Figure 3:
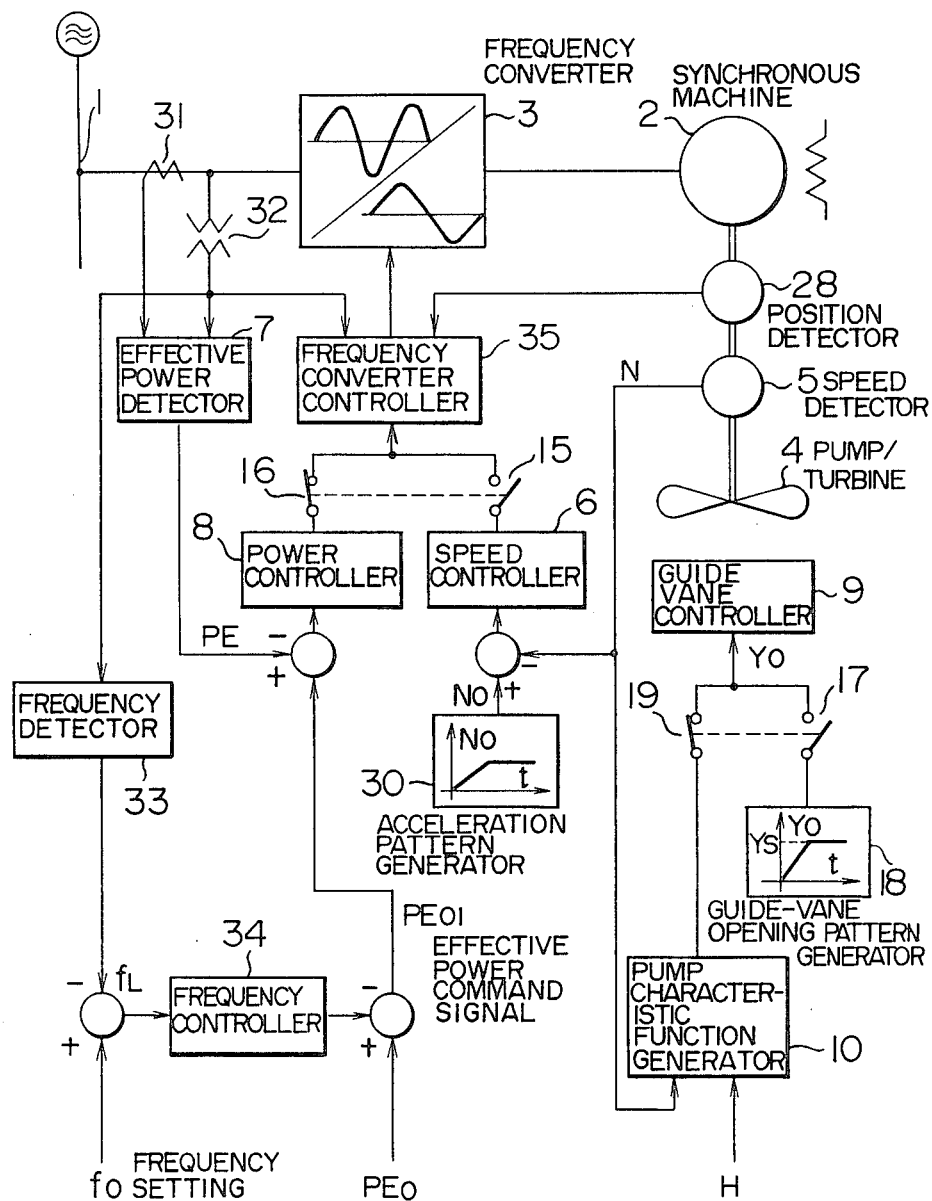
FIG. 3 is a block diagram showing a second embodiment of the present invention.

FIG. 3 shows a second embodiment which is a modification of the first embodiment shown in FIG. 1. The second embodiment shown in FIG. 3 differs from the first embodiment shown in FIG. 1 in that a pump characteristic function generator 10 and switches 17, 19 are additionally provided. A pump rotation speed detection signal N and a pump head detection signal H are applied as inputs to the function generator 10, and the function generator 10 generates an optimum guide-vane opening command signal $Y_0$ ensuring a highest pump efficiency.

When the pumping-up electrical power system is not in operation, the switches 19 and 17 are in their open and closed positions respectively, and all the other parts are under the same conditions as those described with reference to FIG. 1. When the guide-vane opening command signal $Y_0$ attains the level $Y_S$ where the AFC mode takes place, the switches 19 and 17 are closed and opened respectively, and the guide-vane opening command signal $Y_0$ is replaced by the output signal of the pump characteristic function generator 10.

The operation of the pump characteristic function generator 10 will now be described.

Figure 4:
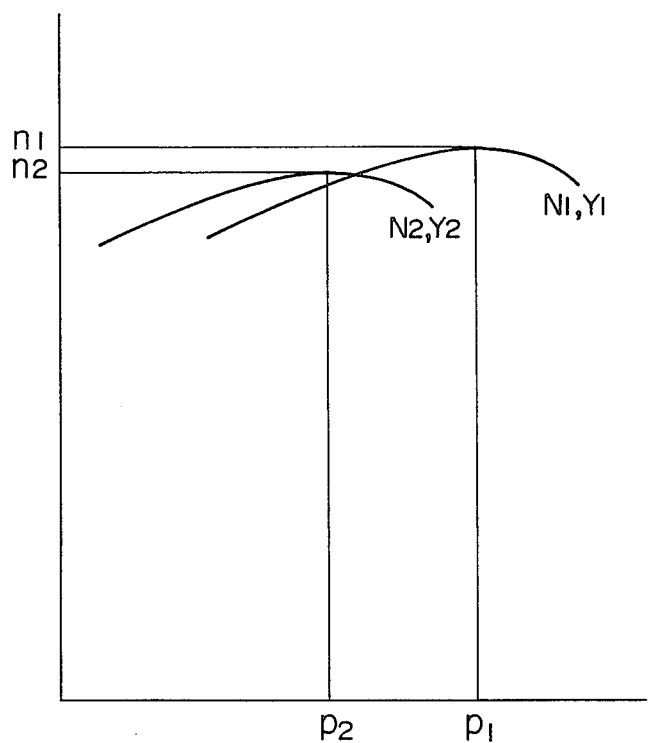
FIG. 4 is a graph showing an example of an efficiency vs. pump output characteristic of a Francis turbine.

A Francis turbine is commonly used as a generator in a pumped-storage power station, and the relation between its output P and its efficiency $\eta$ is generally as shown in FIG. 4. In FIG. 4, the horizontal and vertical axes represent the turbine output P and efficiency $\eta$ respectively, and the turbine rotation speed is taken as a parameter. Symbols $P_1$, $P_2$ designate turbine outputs; $\eta_1$, $\eta_2$ designate efficiencies; $N_1$, $N_2$ designate rotation speeds; and $Y_1$, $Y_2$ designate guide-vane openings. It will be seen in FIG. 4 that the efficiency $\eta_1$ is highest at the turbine rotation speed $N_1$ and guide-vane opening $Y_1$ when the turbine output is $P_1$, and the efficiency $\eta_2$ is highest at the turbine rotation speed $N_2$ and guide-vane opening $Y_2$ when the turbine output is $P_2$. Thus, the turbine rotation speed providing the highest efficiency differs depending on the turbine output, and it is the principal purpose of the present invention to operate the turbine at the point of its highest efficiency.

Figure 5:
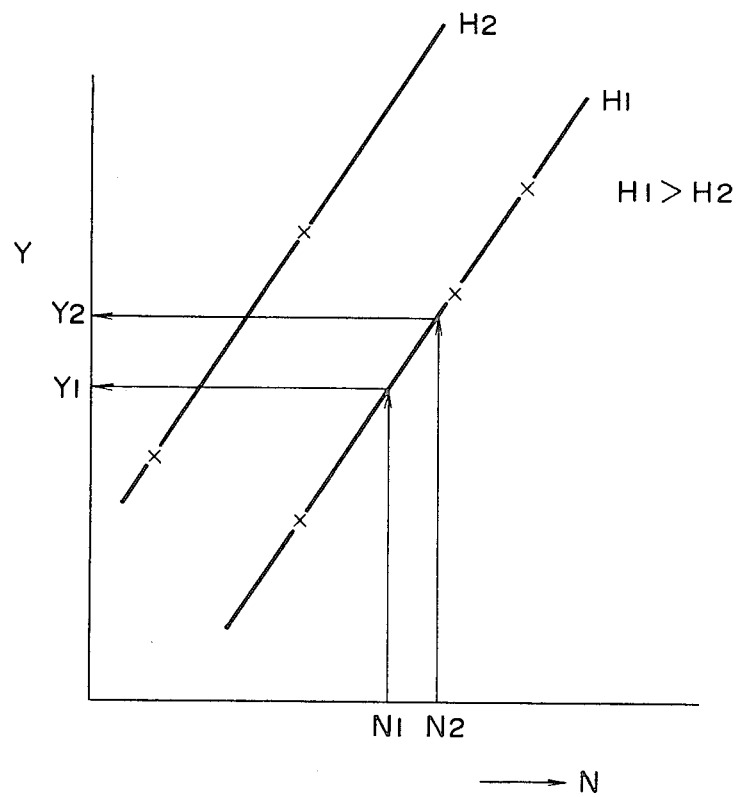
FIG. 5 is a graph showing the relation between the input and the output of the pump characteristic function generator shown in FIG. 3.

FIG. 5 shows how the pump characteristic function generator 10 determines the guide-vane opening providing the highest efficiency on the basis of the pump rotation speed and pump head. The optimum guide-vane opening $Y_0$ is determined on the basis of the pump rotation speed N using the pump head H as a parameter. In FIG. 5, there is the relation $H_1 > H_2$ between pump heads $H_1$ and $H_2$. FIG. 5 teaches that the guide-vane opening Y is required to be changed from $Y_1$ to $Y_2$ when the pump rotation speed N is changed from $N_1$ to $N_2$ while the pump is operating with the head $H_1$.

The second embodiment shown in FIG. 3 is constructed so that governor-free operation can also be carried out. Thus, in the pumping operation mode, the governor-free operation can be carried out at the point of the highest efficiency of the pump/turbine relative to any value of input power supplied from the a.c. power system.

Figure 6:
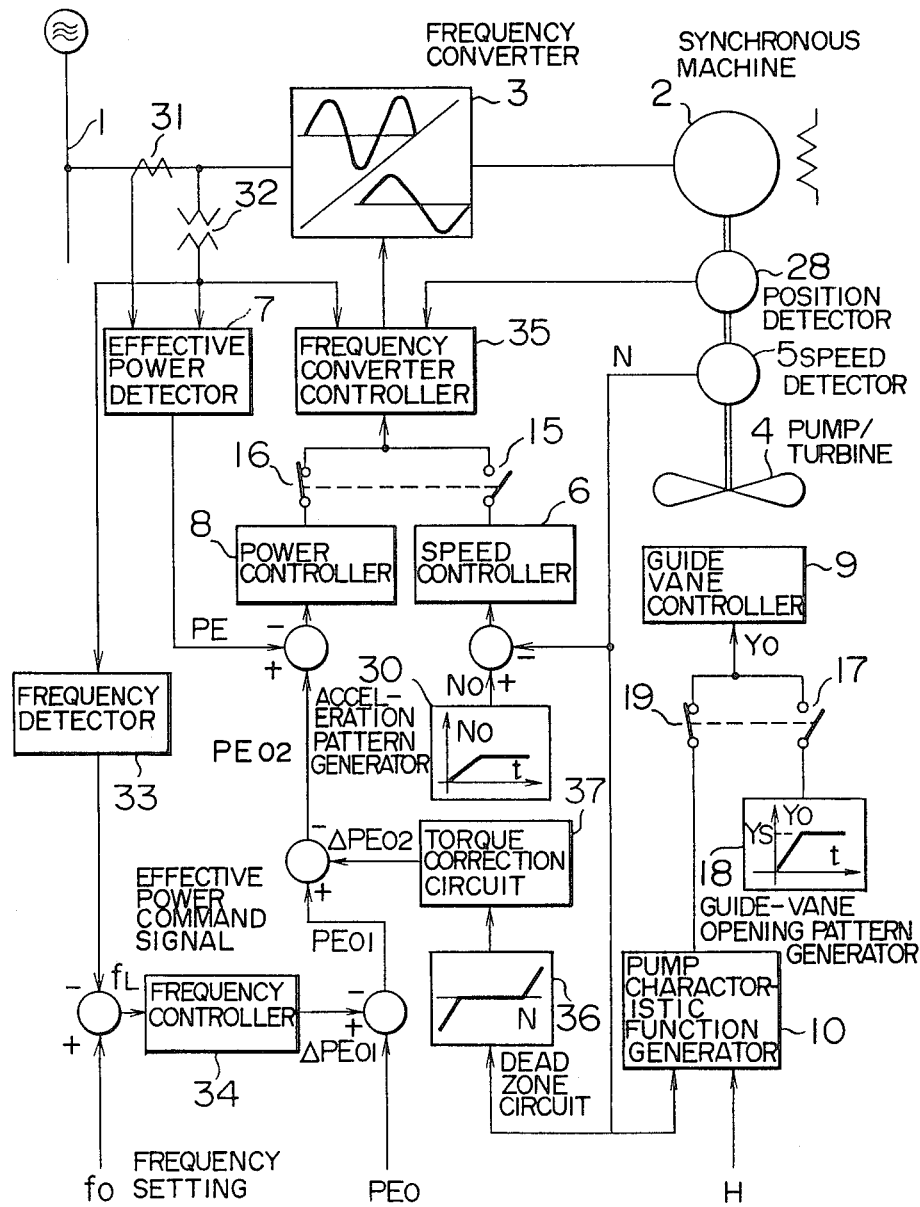
FIG. 6 is a block diagram showing a third embodiment of the present invention.

FIG. 6 shows a third embodiment of the present invention. This third embodiment is a modification of the second embodiment shown in FIG. 3 and is intended to carry out both the governor-free operation and the pump operation at the point of its highest efficiency.

In FIG. 6, the same reference numerals are used to designate the same functional parts appearing in FIG. 3, and the operation of the third embodiment will be described while placing emphasis on differences thereof from the embodiment shown in FIG. 3.

The differences between the embodiment shown in FIG. 6 and that shown in FIG. 3 are addition of a dead zone circuit 36, a torque correction circuit 37 generating an effective power command correction signal $\Delta PE_{02}$ as its output signal on the basis of an input signal applied from the dead zone circuit 36, and an element subtracting the output signal $\Delta PE_{02}$ of the torque correction circuit 37 from the effective power command signal $PE_0$. The dead zone circuit 36 receives the output signal N of the speed detector 5 as its input. When the value of N lies within a certain range from the center of the width of the variable speed of the generator/motor 2, the dead zone circuit 36 generates no output signal, but when the value of N comes close to either end of the width of the variable speed, the circuit 36 generates an output signal.

In the steady state, the effective power command signal $PE_0$ remains constant, the system frequency error ($f_O$-$f_L$) is null, and the pump rotation speed N remains unchanged. In the above state, the pump 4 can continue its pumping operation without any problem when the effective power command signal $PE_0$ lies between an upper limit and a lower limit of the effective power input PE corresponding to the upper and lower limits respectively of the width of the variable speed. However, when the effective power command signal $PE_0$ tends to fluctuate or when the system frequency tends to abruptly change, the pump may not always rotate at the speed lying within the width of the variable speed, and such a phenomenon may transiently occur.

The effective power command correction signal $\Delta PE_{02}$ is generated to correct the motor torque in such a transient period so that the pump rotation speed N may deviate from the width of the variable speed. That is, when the rotation speed N of the pump tends to deviate from the variable speed width toward a high speed side, the power input to the motor 2 is decreased to add decelerating torque to the motor torque, and, on the other hand, when the pump rotation speed N tends to deviate from the variable speed width toward a low speed side, the power input to the motor is increased to add accelerating torque to the motor torque. In the dead zone except the end portions of the width of the variable speed, the output signal of the dead zone circuit 36 is null, and the effective power PE is controlled to be equal to the power commanded by the command signal $PE_0$ (with the exception of the correction signal $\Delta PE_{01}$ corresponding to the governor-free operation). In the manner described above, a speed error signal detected in the speed control system is converted into a power command correction signal which is always connected to the effective power control loop. Therefore, the embodiment is advantageous in that troublesome processing requiring change-over between the speed control and the power control becomes unnecessary, thereby simplifying the structure of the pumping-up electrical power system.

Figure 7:
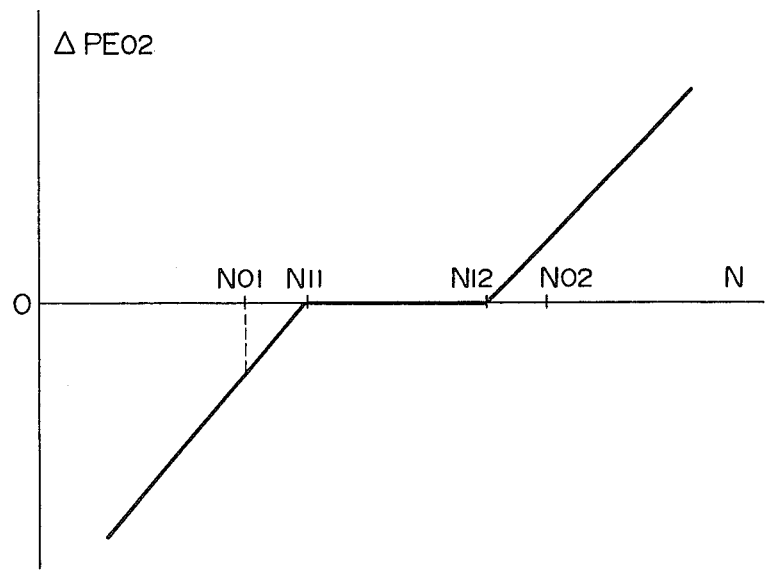
FIG. 7 shows the operating characteristic of the dead zone circuit shown in FIG. 6.

FIG. 7 illustrates the concept of the dead zone circuit 36 shown in FIG. 6. In FIG. 7, $N_{01}$ and $N_{02}$ designate the lower limit and the upper limit respectively of the variable speed width of the pump rotation speed N, and $N_{11}$ and $N_{12}$ designate the lower limit and the upper limit respectively of the dead zone of the pump rotation speed N. Thus, by selecting the dead zone to lie between the upper and lower limits of the variable speed width, the pump can be rotated at a speed lying within the variable speed width in, for example, a transient period.

Figure 8:
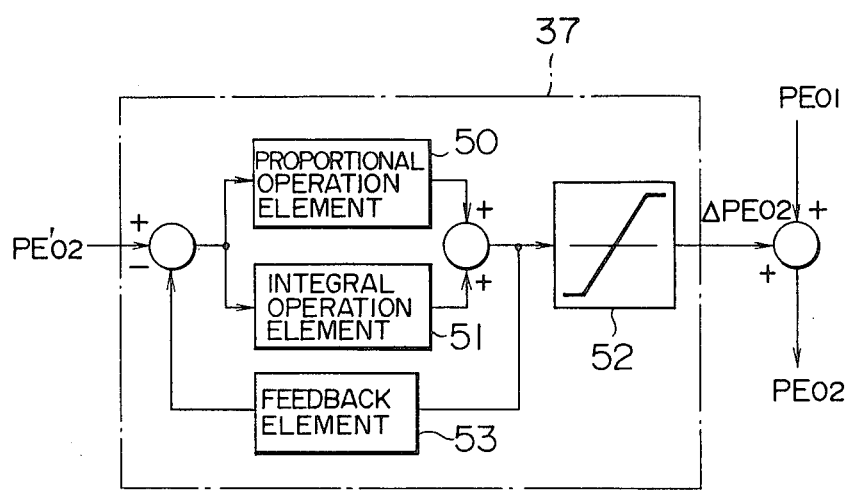
FIG. 8 is a block diagram showing the structure of the torque correction circuit shown in FIG. 6.

FIG. 8 is a block diagram showing the structure of one form of the torque correction circuit 37 shown in FIG. 6. Referring to FIG. 8, the output signal $\Delta PE'_{02}$ of the dead zone circuit 36 is subjected to PI (proportional plus integral) control by a proportional operation element 50 and an integral operation element 1. Output signals of these two elements 50 and 51 are added together, and the resultant signal is passed through a feedback element 53 to be subtracted from the signal $\Delta PE'_{02}$. Thus, when the signal $\Delta PE'_{02}$ is null, the output signal $\Delta PE_{02}$ of the torque correction circuit 37 can be rendered null. A limiter 52 determines an upper limit and a lower limit of the correction signal $\Delta PE_{02}$, so that the value of $\Delta PE_0$ may not become larger or smaller than the upper limit or lower limit, and on overcorrection may not result.

It will be understood from the foregoing detailed description of the present invention that, in a variable speed pumping-up electrical power system, a power input applied to a variable speed electrical machine can be regulated according to an external command signal even when a pump/turbine is operating in its pumping mode, so that electrical power-system control such as AFC, which has not been utterly applicable, can now be applied to the electrical power system. In addition, the variable speed electrical machine can be continuously stably operated in a predetermined range of its variable speed.

Thus, in the pumping-up electrical power system in which the pump/turbine operates in its generating mode in the daytime but in its pumping mode in the nighttime for the purpose of leveling variations of the load of an associated a.c. power system, a power regulation requirement from the a.c. power system, when the pump/turbine is operating in its pumping mode, can be efficiently dealt with to provide a great economical effect.

We claim:

1. A variable speed pumping-up electrical power system comprising:
    a variable speed electrical machine;
    a frequency converter connected between said variable speed electrical machine and an a.c. power system;
    a pump/turbine driven by said variable speed electrical machine;
    a speed detector detecting the rotation speed of said pump/turbine;
    a power detector detecting effective power supplied to said variable speed electrical machine from said a.c. power system;
    a frequency converter controller controlling said frequency converter so as to eliminate any error between the value of effective power detected by said power detector and the value of effective power commanded by an externally-applied effective power command signal, a frequency detector detecting the frequency of said a.c. power system, a frequency controller comparing the frequency detected by said frequency detector with a frequency setting to generate a correction signal for correcting said effective power command signal, and means for correcting the value of the externally commanded effective power by said correction signal.

2. A variable speed pumping-up electrical power system according to claim 1, further comprising means for correcting the value of the externally commanded effective power on the basis of a deviation of the rotation speed of said pump/turbine detected by said speed detector from an upper limit and a lower limit of a predetermined speed range.

3. A variable speed pumping-up electrical power system according to claim 1, further comprising means for generating a control signal controlling the opening of guide vanes of said pump/turbine as a function of a pumping-up head of said pump/turbine and the rotation speed of said pump/turbine detected by said speed detector.

4. A variable speed pumping-up electrical power system according to claim 3, further comprising means for correcting the value of the externally commanded effective power on the basis of a deviation of the rotation speed of said pump/turbine detected by said speed detector from an upper limit and a lower limit of a predetermined speed range.

* * * * *